United States Patent
Nagaoka et al.

(10) Patent No.: US 6,234,682 B1
(45) Date of Patent: May 22, 2001

(54) OPTICAL CONNECTOR

(75) Inventors: Yasutaka Nagaoka; Nobuhiko Suzuki; Hiroyuki Kondo; Norihito Suzuki, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/338,924

(22) Filed: Jun. 23, 1999

(30) Foreign Application Priority Data

Jun. 23, 1998 (JP) .................................................. 10-176288

(51) Int. Cl.⁷ ........................................................ G02B 6/36
(52) U.S. Cl. .............................. 385/78; 385/60; 385/59; 385/72
(58) Field of Search ................................. 385/78, 53, 56, 385/59, 60, 66, 73, 72, 76, 77, 80, 81, 86, 87, 84, 92, 140

(56) References Cited

U.S. PATENT DOCUMENTS 4,798,440   1/1989   Hoffer et al. ........................ 350/96.2
5,265,183   11/1993  Feng et al. ............................. 385/78
6,059,461 * 5/2000   Aoki et al. ............................. 385/60

FOREIGN PATENT DOCUMENTS 0 819 960    1/1998   (EP) .................. G02B/6/38
63-282709    11/1988  (JP) .................. G02B/6/36
WO 94/15232  7/1994   (WO) ................. G02B/6/38

* cited by examiner

*Primary Examiner*—Phan T. H. Palmer
(74) *Attorney, Agent, or Firm*—Sughrue, Mion, Zinn, Macpeak & Seas, PLLC

(57) ABSTRACT

An optical connector 1 includes an optical connector plug 2 including a photoconductive member 105, and a ferrule 3 receiving and retaining an end portion of the photoconductive member 105 therein. A coil spring 109 is retained on or fixed to the ferrule 3 at one end portion thereof. The optical connector further includes a connector housing 123, having a receiving chamber 139 for receiving the ferrule 3, and a ferrule holder 122. The other end portion of the coil spring 109, remote from the one end portion thereof, abuts against the ferrule holder 122 to maintain an urged condition of the optical connector plug 2 within the receiving chamber 139.

5 Claims, 9 Drawing Sheets

OPTICAL CONNECTOR

BACKGROUND OF INVENTION

1. Field of Invention

This invention relates to an optical connector, and more particularly to an optical connector in which an error in the mounting of a coil spring of an optical connector plug is prevented, and also the efficiency of the operation is enhanced.

2. Related Art

FIG. 12 shows one known conventional optical connector.

In this Figure, the optical connector 201 comprises optical connector plugs 202, a ferrule holder 203, and a connector housing 204.

Each of the optical connector plugs 202 includes photoconductive member 205 (e.g. optical fiber), and a cylindrical ferrule 206 having a smaller-diameter portion 206a and a larger-diameter portion 206b. A conductor portion (not shown) of each of the photoconductive members 205 is received in the smaller-diameter portion 206a, and a sheath 205a thereof is received in the larger-diameter portion 206b.

The ferrule holder 203 includes a box-like housing 207, having a front end surface part of which is open for the optical connector plugs 202, and a support wall 208 of an oval cross-section formed integrally on a rear end surface of the housing 207. A recess 207b is formed in a central portion of an upper wall 207a of the housing 207, and rectangular retaining holes 207c are formed in this upper wall 207a, and are disposed respectively on opposite sides of the recess 207b. Insertion holes 208a for respectively passing the pair of photoconductive members 205 therethrough are formed through the support wall 208.

The connector housing 204 includes hollow plug-receiving chambers 204a for respectively receiving the optical connector plugs 202, and a lock arm 204c for engagement with a housing of a mating connector (not shown) is formed on a front end portion of an upper wall 204b of this connector housing, and retaining projections 204d, corresponding respectively to the retaining holes 207c, are formed on a rear end portion of the upper wall 204b.

A recess 204e is formed in a central portion of the upper wall 204b, and a guide portion 204f for the ferrule holder 203 is formed in communication with the recess 204e.

In the above construction, before forming each of the optical connector plugs 202, the photoconductive member 205 is first passed through the ferrule holder 203, and then a compression coil spring (resilient member) 209 is mounted on the photoconductive member 205. As the ferrule holder 203 is connected, together with the optical connector plugs 202, to the connector housing 204, the ferrule holder 203 is guided by the guide portion 204f, and shown in FIG. 13, the retaining projections 204d (only one of which is shown in FIG. 13) on the connector housing 204 are firmly engaged respectively in the retaining holes 207c (only one of which is shown in FIG. 13) in the ferrule holder 203, thereby forming the optical connector 201 which is now ready for connection to the housing of the mating connector (not shown).

In this condition, each optical connector plug 202 has a slight play because of the resilient force of the compression coil spring 209 acting between an engagement projection 206c, formed on the outer surface of the larger-diameter portion 206b of the ferrule 206 over an entire periphery thereof, and an engagement portion 207d formed within the housing 207.

In the above prior art, before forming the optical connector plugs 202, the photoconductive members 205 must be passed through the ferrule holder 203, and therefore there has been encountered a problem that the efficiency of the operation can not be enhanced because of this cumbersome operation.

And besides, the ferrule holder 203 and the connector housing 204 are firmly engaged with each other, and therefore for example, even when it becomes necessary to effect the maintenance of the optical connector 201 or to exchange the connector housing 204, the engagement between the ferrule holder 203 and the connector housing 204 can not be easily canceled, and in some cases there is a possibility that this leads to damage to these parts.

Furthermore, since the optical connector plug 202 is formed at the end portion of the photoconductive member 205, the photoconductive member 205 can not be removed from the ferrule holder 203, which leads to a problem that the optical connector 201 can not have extensibility.

SUMMARY OF INVENTION

With the above problems in view, it is an object of this invention to provide an optical connector in which an assembling operation is easy, and the efficiency of the operation is markedly enhanced, and measures are taken against assembling errors.

An optical connector of the present invention, which has been made in order to solve the above problems, comprises an optical connector plug comprising a photoconductive member, and a ferrule receiving and retaining an end portion of the photoconductive member therein, there being provided a coil spring retained on or fixed to the ferrule at one end portion thereof; a connector housing for fitting connection to a housing of a mating connector, the connector housing having a receiving chamber for receiving the ferrule; and a ferrule holder which receives the optical connector plug, and is fitted on the connector housing, the other end portion of the coil spring, remote from the one end portion thereof, abutting against the ferrule holder to maintain an urged condition of the optical connector plug within the receiving chamber.

In the above construction, the optical connector comprises the optical connector plug, the connector housing, and the ferrule holder. The optical connector plug comprises the photoconductive member, and the ferrule receiving and retaining the end portion of the photoconductive member therein, and there is provided the coil spring retained on or fixed to the ferrule at one end portion thereof. The connector housing has the receiving chamber for receiving the ferrule, and is adapted to be fitted in the housing of the mating connector. The ferrule holder receives the optical connector plug, and is fitted on the connector housing, and the other end portion of the coil spring, remote from the one end portion thereof, abuts against the ferrule holder to maintain an urged condition of the optical connector plug within the receiving chamber.

In this construction of the optical connector, the one end portion of the coil spring is retained on or fixed to the ferrule, and therefore the assembling operation is easy. More specifically, when forming the optical connector plug, the coil spring is kept in a stable condition, and in contrast with the conventional construction, the coil spring will not slide down along the photoconductive member in contrast with the conventional construction.

And besides, there will not occur a confirmation failure which would cause an error in the assembling operation, such as the omission of the coil spring and the fitting of more than one coil spring.

Therefore, there can be provided the optical connector in which the assembling operation is easy, and the efficiency of the operation is markedly enhanced, and the measures are taken against assembling errors.

In the optical connector of the present invention, the one end portion of the coil spring is insert molded in the ferrule.

In the above construction, the one end portion of the coil spring is insert molded in the ferrule, and by doing so, the above retaining or fixing of the coil spring is achieved.

By thus insert molding the one end portion of the coil spring in the ferrule, there is no need to make any confirmation for an error in the mounting of the coil spring. And besides, the operation, heretofore required for fitting the coil spring on the photoconductive member, is omitted. Furthermore, when inserting the photoconductive member into the ferrule, the coil spring does not hinder this inserting operation, and the photoconductive member can be inserted while firmly holding this photoconductive member, and therefore the stability of the operation is enhanced.

Therefore, the assembling operation is easy, and the efficiency of the operation is markedly enhanced, and the effective measures are taken against errors in the mounting of the coil spring.

There is achieved another advantage that the number of the component parts is reduced.

In the optical connector of the present invention, the one end portion of the coil spring is engaged with a retaining portion formed on the ferrule.

In the above construction, the one end portion of the coil spring is engaged with the retaining portion formed on the ferrule, and by doing so, the above retaining or fixing of the coil spring is achieved.

With this construction in which the one end portion of the coil spring is thus engaged, the operator can confirm the mounting of the coil spring when engaging the coil spring with the retaining portion, and therefore an assembling error will not occur. And besides, when inserting the photoconductive member into the ferrule, the coil spring does not hinder this inserting operation, and the photoconductive member can be inserted while firmly holding this photoconductive member, and therefore the stability of the operation is enhanced.

Therefore, the assembling operation is easy, and the efficiency of the operation is markedly enhanced, and the effective measures are taken against errors in the mounting of the coil spring.

In the optical connector of the present invention, the retaining portion has claw-like projections with which the one end portion of the coil spring is engaged.

In the above construction, the retaining portion, formed on the ferrule, has the claw-like projections with which the one end portion of the coil spring is engaged.

Therefore, with this simple construction, the coil spring is easily retained, and the assembling operation can be carried out without affecting the efficiency of the operation even as compared with the conventional assembling process.

In the optical connector of the present invention, the retaining portion has ribs on which the one end portion of the coil spring is press-fitted.

In the above construction, the retaining portion, formed on the ferrule, has the ribs on which the one end portion of the coil spring is press-fitted.

Therefore, with this simple construction, the coil spring is easily retained, and the assembling operation can be carried out without affecting the efficiency of the operation even as compared with the conventional assembling process.

In the optical connector of the present invention, an insertion-side end of the ferrule for receiving the photoconductive member is disposed axially outwardly of the other end portion of the coil spring.

In the above construction, the insertion-side end of the ferrule for receiving the photoconductive member is disposed axially outwardly of the other end portion of the coil spring.

With this construction of the ferrule, for example, during the correction of the bonding surface between the ferrule and the photoconductive member, that is, during the correcting operation in which an adhesive, squeezed out when the photoconductive member is inserted into the ferrule, is removed, the coil spring will not hinder this correcting operation. More specifically, in the conventional construction, the coil spring is liable to slide down and drop, and therefore the operation must be carried out while holding the coil spring with the hand during the correcting operation, and the coil spring hinders this correcting operation, thus lowering the efficiency of the operation. With the above construction, however, the other end portion of the coil spring is spaced from the bonding surface, and therefore will not hinder the operation.

Therefore, the efficiency of the correcting operation for removing the squeezed-out portion of the adhesive can be enhanced.

DETAILED DESCRIPTION OF PREFERRED EMBODIMENTS

Figure 5:
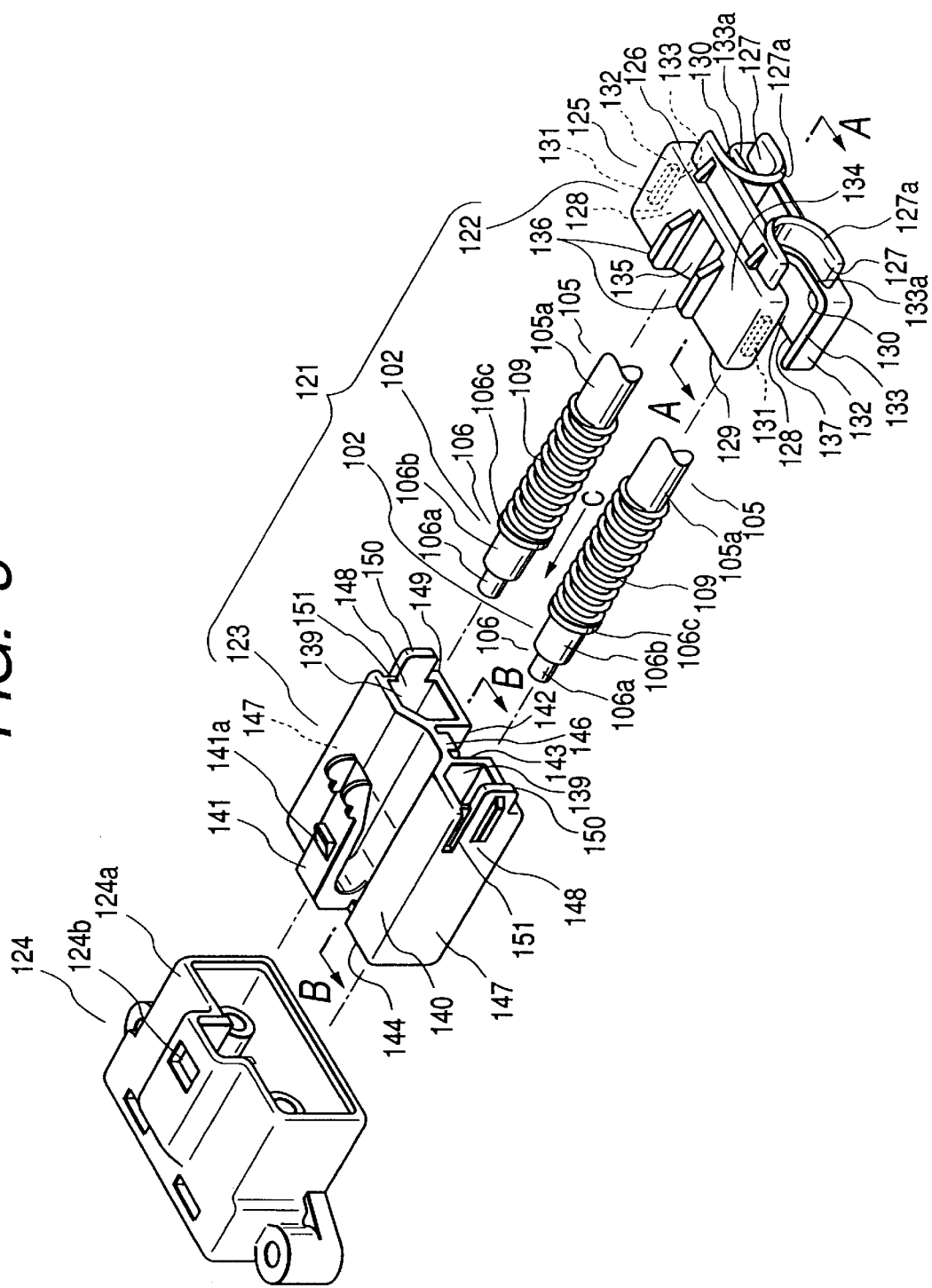
FIG. 5 is an exploded, perspective view of a optical connector related to the present invention.

FIG. 5 shows an optical connector earlier proposed by the Applicant of the present application. This optical connector 121 comprises a pair of optical connector plugs 102 and 102, a ferrule holder 122, and a connector housing 123, and this optical connector is adapted to be fitted in a mating connector 124.

Figure 11:
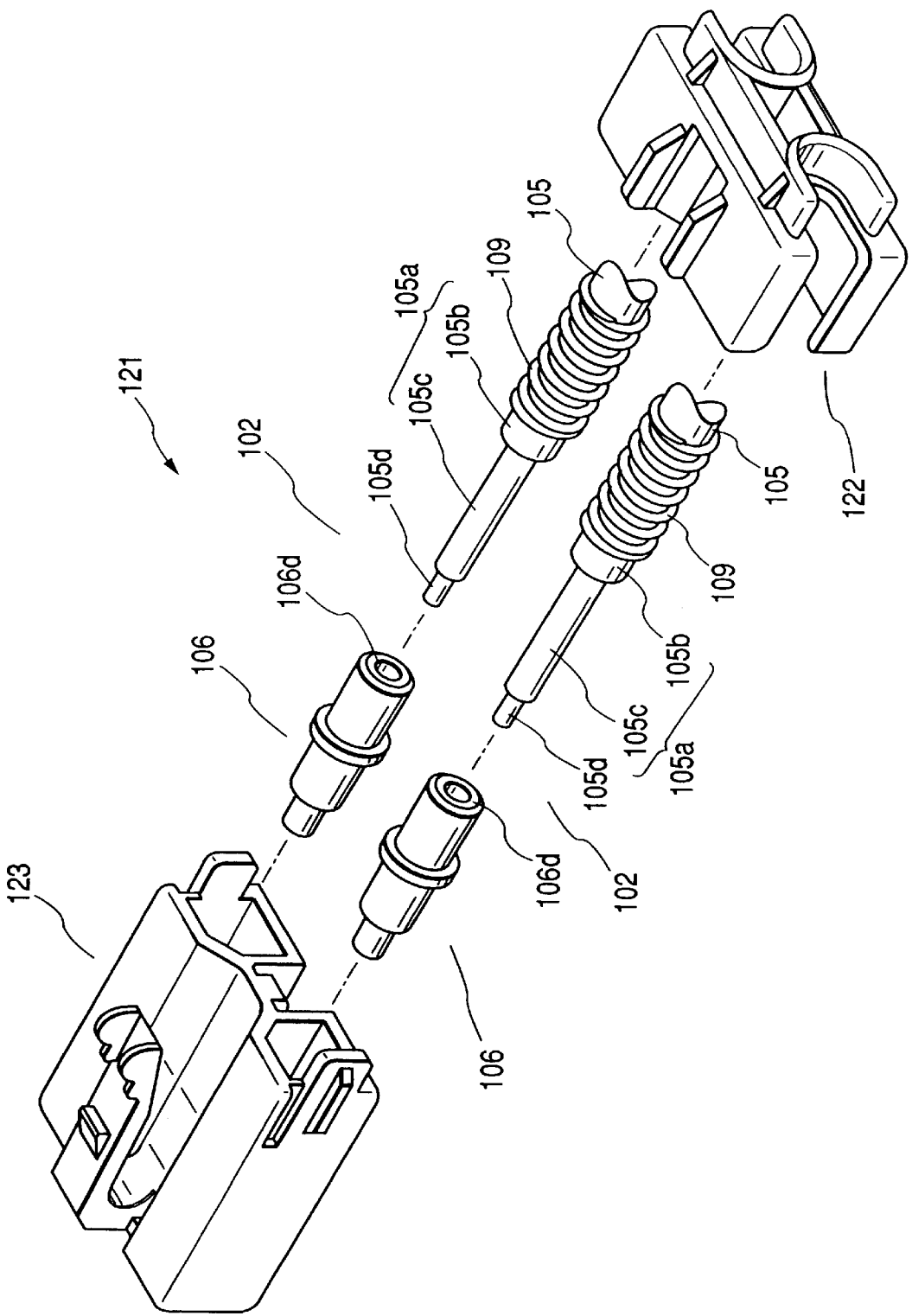
FIG. 11 is an exploded, perspective view showing the optical connector and the optical plugs in FIG. 5.
Figure 12:
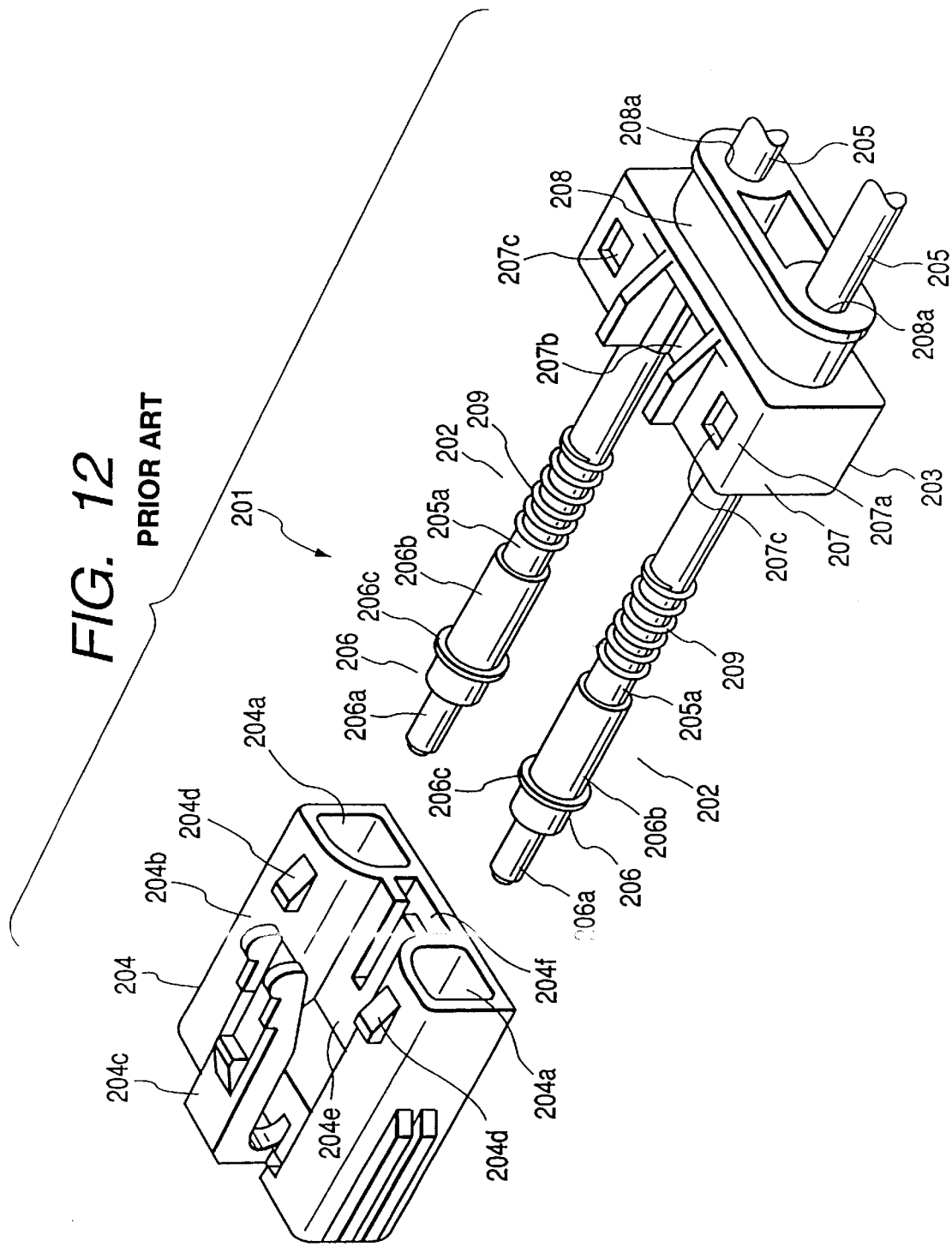
FIG. 12 is an exploded, perspective view of a conventional optical connector.
Figure 13:
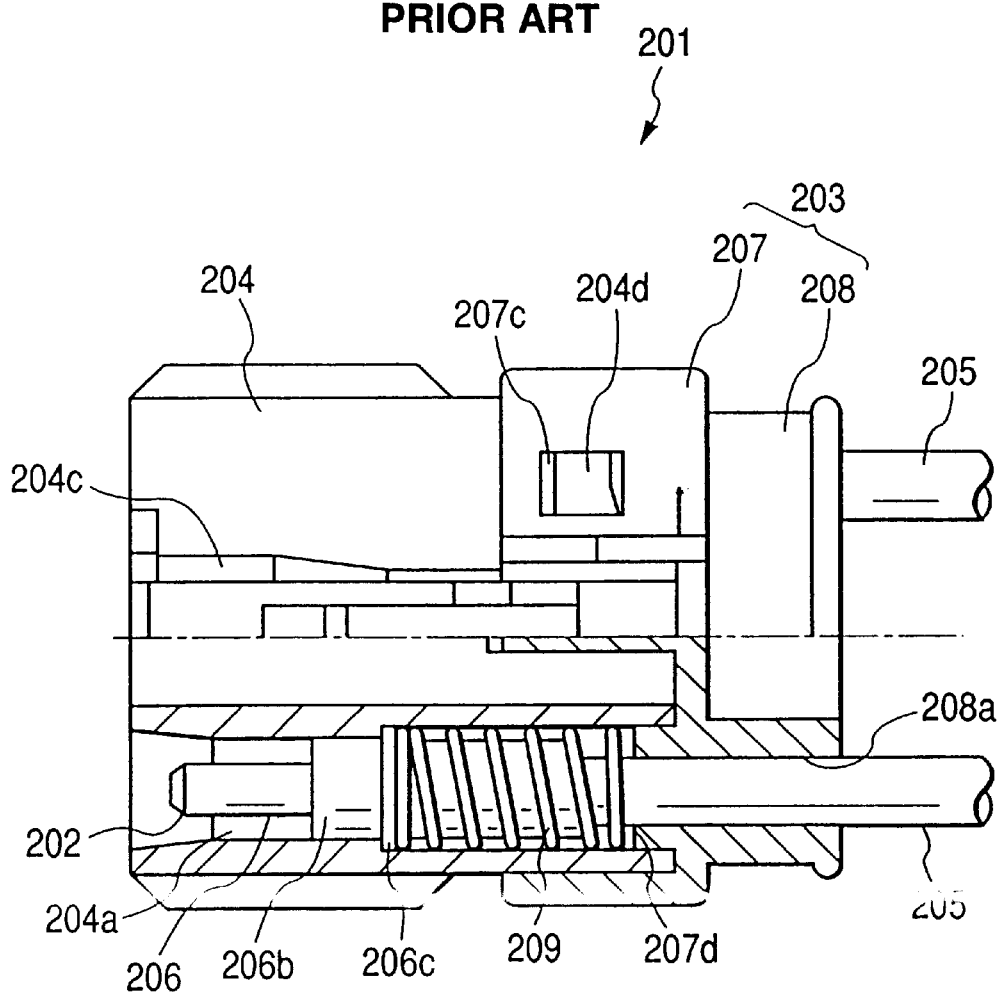
FIG. 13 is a cross-sectional view showing a connector housing and a ferrule holder of FIG. 12 fitted together.

Each of the optical connector plugs 102 and 102 comprises a photoconductive member (optical fiber) 105, and a cylindrical ferrule 106 of a synthetic resin having a smaller-diameter portion 106a and a larger-diameter portion 106b, and a compression coil spring (resilient member) 109. Ends (see FIG. 11) of the photoconductive members 105 and 105 are inserted into the ferrules 106 and 106.

An engagement projection 106c for retaining the compression coil spring 109 is formed on the larger-diameter portion 106b.

The ferrule holder 122 includes a housing 125, made of a synthetic resin, and support walls 127 and 127 formed integrally on a rear wall 126 of the housing 125. Plug receiving chambers 128 and 128 for respectively receiving the optical connector plugs 102 and 102 are formed in the housing 125, and are open to a front end surface 129 of this housing 125.

An engagement portion 130 for retaining the compression coil spring 109, as well as an elongate guide projection 131 for enabling the smooth fitting operation, is formed at the plug receiving chamber 128.

Plug-introducing slits 133 and 133, communicating respectively with the plug receiving chambers 128 and 128, are formed respectively through opposite side walls 132 and 132 of the housing 125 and also through part of the rear wall 126.

Figure 6:
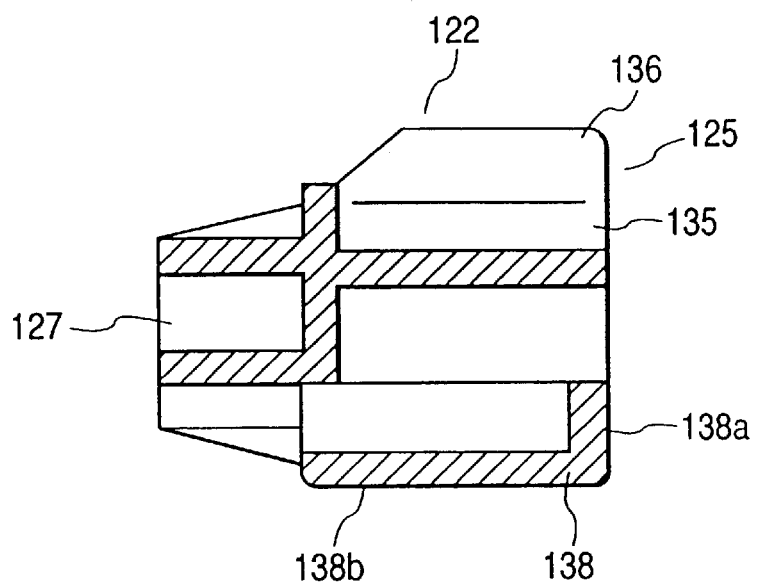
FIG. 6 is a cross-sectional view of a ferrule holder taken along the line A—A of FIG. 5.

A recess 135 is formed in a central portion of an upper wall 134 of the housing 125, and protection walls 136 and 136 for a lock arm 141 (described later) of the connector housing 123 engageable with the mating connector 124 are formed on the upper wall 134 of the housing 125, and are disposed respectively on opposite sides of the recess 135. A retaining portion 138 (see FIG. 6), having an L-shaped cross-section in the direction of the axis of the ferrule holder 122, is formed at a central portion of a lower wall 137 of the housing 125, and an elastic retaining piece portion 146 (described later) of the connector housing 123 is engaged with one wall 138a of the retaining portion 138 disposed perpendicular to the axis of the ferrule holder 122, and the other wall 138b (see FIG. 6) serves to protect this engaged portion.

The support walls 127 and 127 have a C-shaped cross-section in a direction perpendicular to the axis of the ferrule holder 122, and project beyond edge portions 133a and 133a of the plug10 introducing slits 133 and 133 formed at the rear wall 126, and end portions 127a and 127a of these support walls 127 and 127 are curved.

Figure 7:
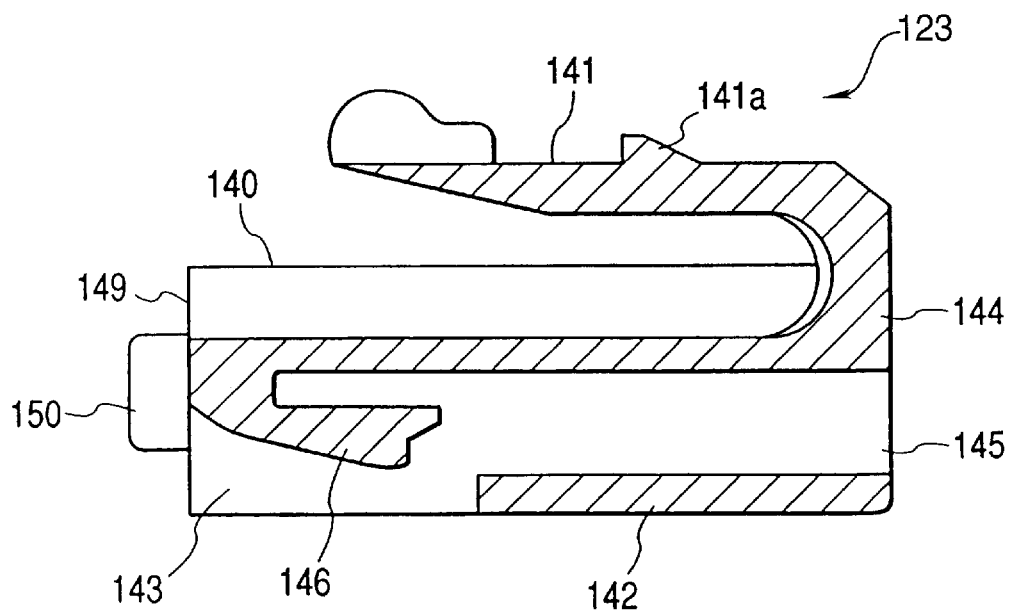
FIG. 7 is a cross-sectional view of a connector housing taken along the line B—B of FIG. 4.

The connector housing 123 is molded of a synthetic resin, and has hollow plug-receiving chambers 139 and 139 for respectively receiving the optical connector plugs 102 and 102. The lock arm 141 for engagement with a housing 124a of the mating connector 124 is formed on a front end portion of an upper wall 140 of the connector housing 123. A recess 143 is formed in a central portion of a lower wall 142, and separates the plug receiving chambers 139 and 139 from each other. A retention cancellation jig-inserting hole 145 (see FIG. 7) is formed in the connector housing 123, and extends from a front end surface 144, and communicates with the recess 143. The elastic retaining piece portion 146 (see FIG. 7) for engagement with the retaining portion 138 of the ferrule holder 122 is formed at the recessed portion 143.

Slit cover portions 148 and 148, corresponding respectively to the plug-introducing slits 133 and 133 formed respectively through the opposite side walls 132 and 132 of the ferrule holder 122, are formed respectively at opposite side walls 147 and 147 of the connector housing 123. Support wall cover portions 150 and 150 of a rectangular shape, corresponding respectively to the support walls 127 and 127 of the ferrule holder 122, are formed on and extend respectively from the slit cover portions 148 and 148, and project beyond the rear end surface 149 of the connector housing 123. Guide grooves 151 and 151 for respectively receiving the elongate guide projections 131 and 131 of the ferrule holder 122 are formed respectively in the slit cover portions 148 and 148.

The assembling of the optical connector 121 of the above construction will now be described with reference to FIG. 5.

First, the compression coil springs 109 and 109 are fitted respectively on the photoconductive members 105 and 105, and then the ferrules 106 and 106 are fitted respectively on the end portions of the photoconductive members 105 and 105, and are fixed thereto by an adhesive, thereby forming the optical connector plugs 102 and 102.

Figure 8:
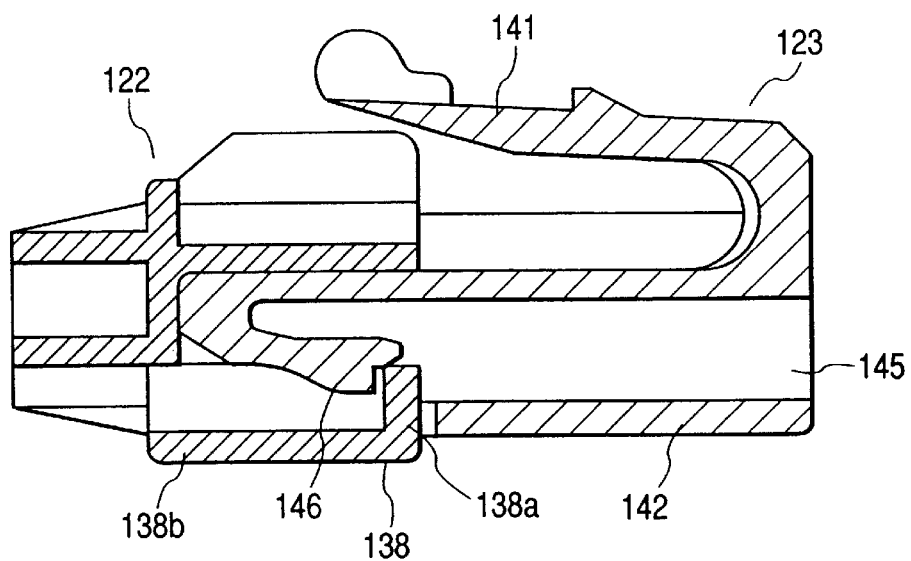
FIG. 8 is a cross-sectional view showing a condition in which the connector housing and the ferrule of FIG. 5 are fitted together.

Then, the optical connector plugs 102 and 102 are introduced respectively into the plug receiving chambers 128 and 128 of the ferrule holder 122 through the plug-introducing slits 133 and 133, and as the ferrule holder 122 is fitted on the connector housing 123 (in a direction of arrow C), the elongate guide projections 131 and 131 are brought into sliding engagement with the guide grooves 151 and 151, respectively, and then the elastic retaining piece portion 146 is brought into engagement with the one wall 138a of the retaining portion 138, as shown in FIG. 8, so that the connector housing 123 and the ferrule holder 122 are fitted together.

At this time, each of the optical connector plugs 102 and 102, inserted in the associated plug receiving chamber 139 of the connector housing 123, has a play (this condition is not shown in the drawings. Instead, see FIG. 5) because of the resilient force of the compression coil spring 109 acting between the engagement projection 106c of the ferrule 106 and the engagement portion 130 of the ferrule holder 122.

Those portions of the plug-introducing slits 133 and 133, formed respectively through the opposite side walls 132 and 132 of the ferrule holder 122, are covered respectively with the slit cover portions 148 and 148, and also the support walls 127 and 127 are covered respectively with the support wall cover portions 150 and 150 projecting respectively from the plug-introducing slits 133 and 133, thereby preventing the disengagement of the optical connector plugs 102 and 102.

Figure 9:
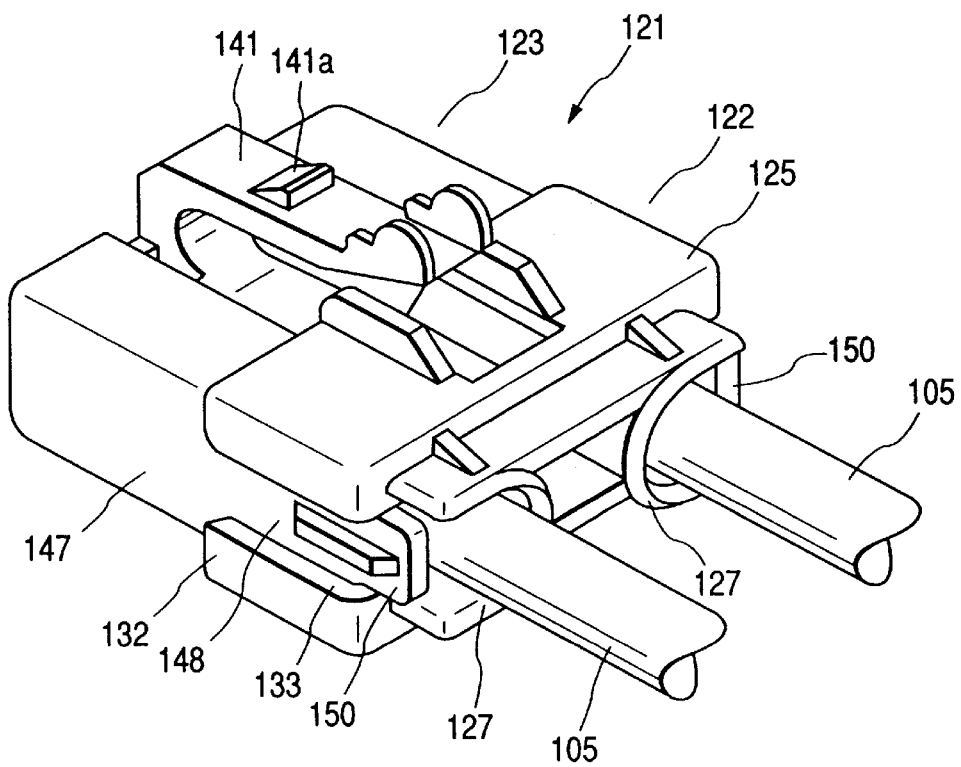
FIG. 9 is a perspective view showing the appearance in the fitted condition FIG. 8.
Figure 10:
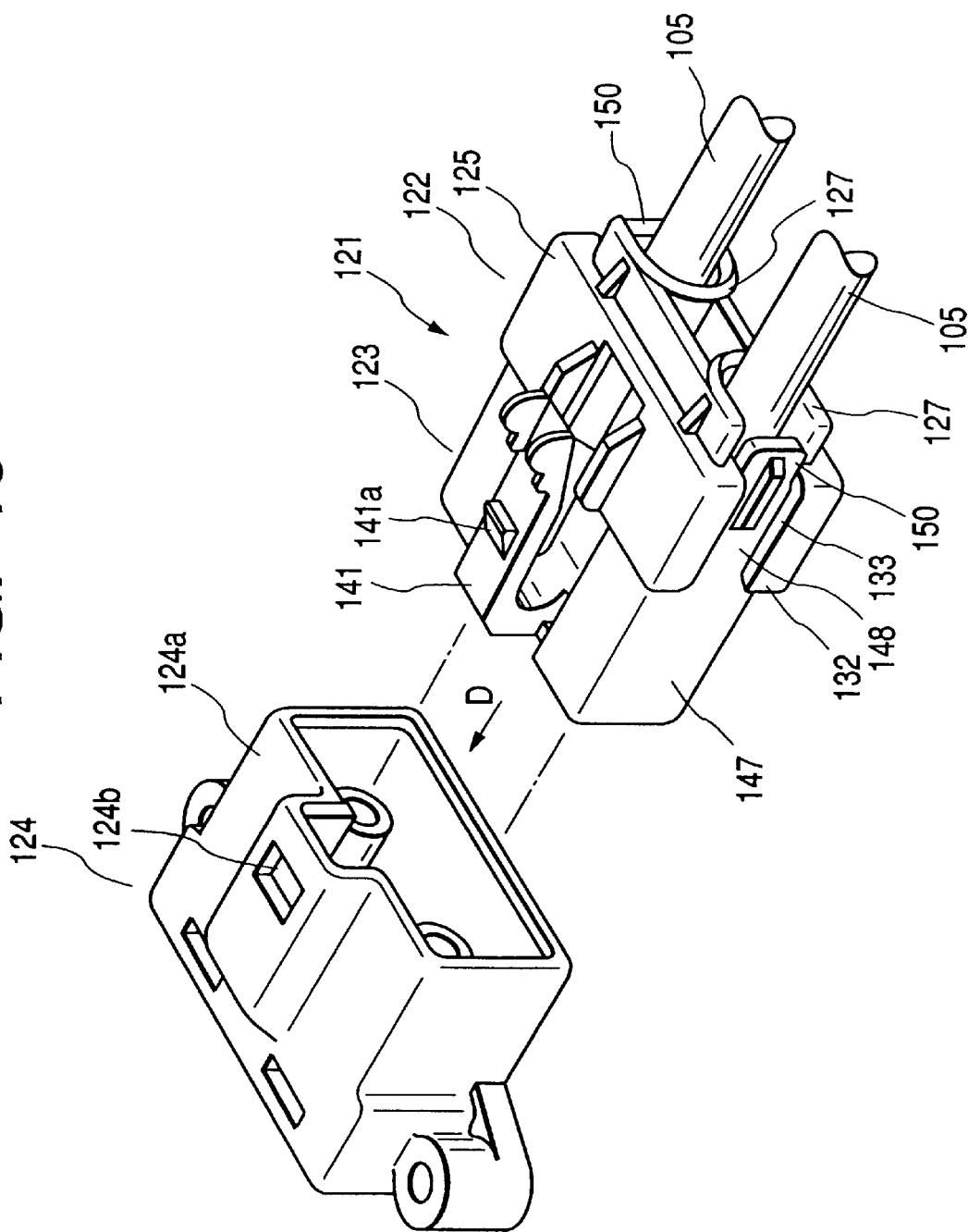
FIG. 10 is a perspective view explanatory of the fitting connection between the optical connector of FIG. 5 and a mating connector.

The thus assembled optical connector 121, shown in FIG. 9, can be connected to the housing 124a of the mating connector 124 (see FIG. 5). When the optical connector 121 is moved in a direction of arrow D to be fitted into the mating connector as shown in FIG. 10, a retaining projection 141a, formed on the lock arm 141, is engaged in a retaining hole 124b formed in the housing 124a, so that the optical connector 121 is connected to the mating connector 124.

In the above technique, the optical connector 121 is formed into the construction shown in FIG. 5, and with this construction, the assembling operation is much easier as compared with those optical connectors proposed before the above conventional technique, and therefore there is achieved an advantage that the efficiency of the operation is greatly enhanced. And besides, the maintenance ability can be enhanced, and the extensibility can be obtained.

Embodiment

Figure 1:
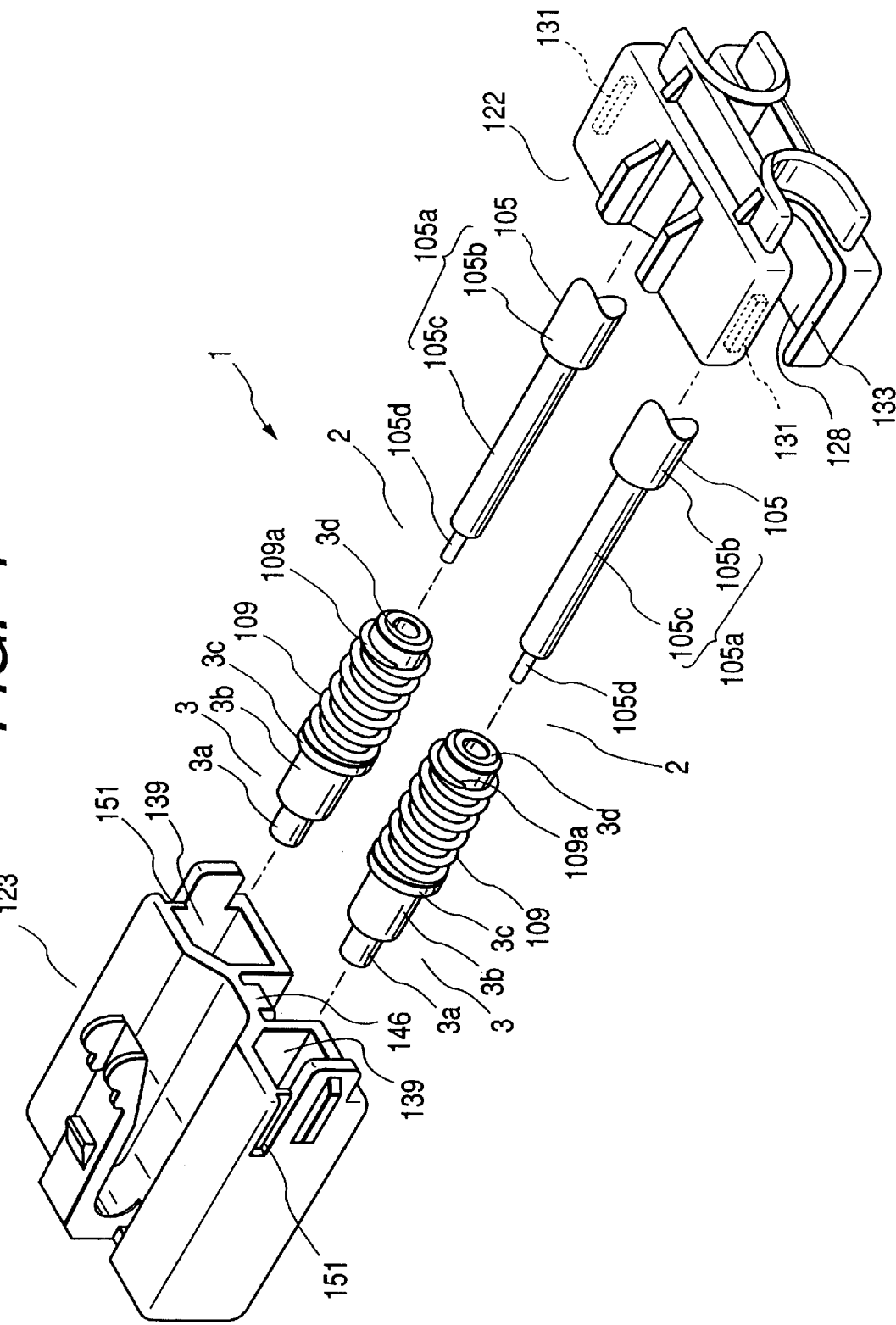
FIG. 1 is an exploded, perspective view showing one preferred embodiment of an optical connector of the invention.
Figure 2:
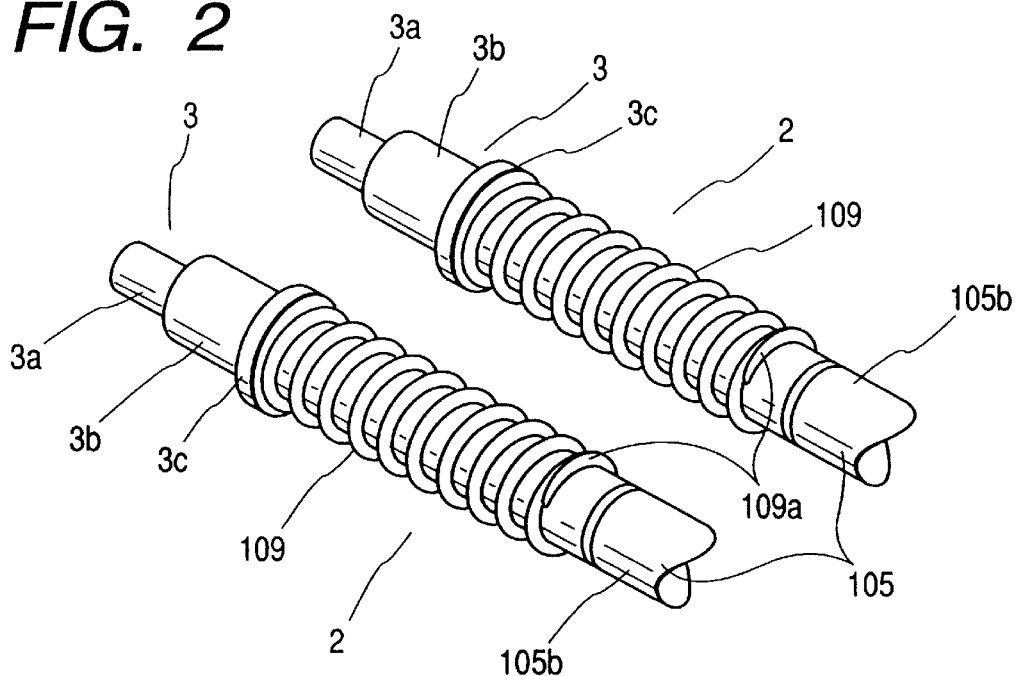
FIG. 2 is an enlarged, perspective view of an optical connector plug in FIG. 1.
Figure 3:
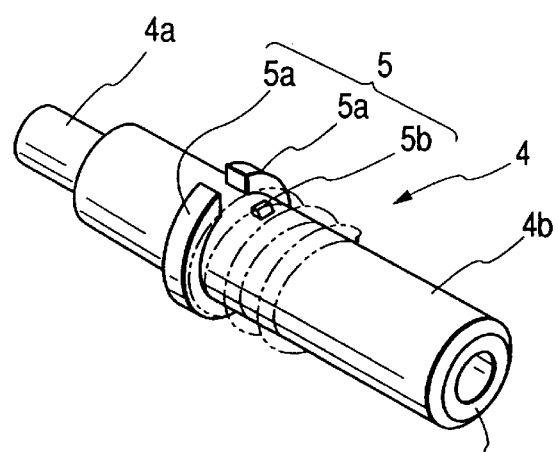
FIG. 3 is a perspective view showing a modified form of a ferrule in FIG. 1.
Figure 4:
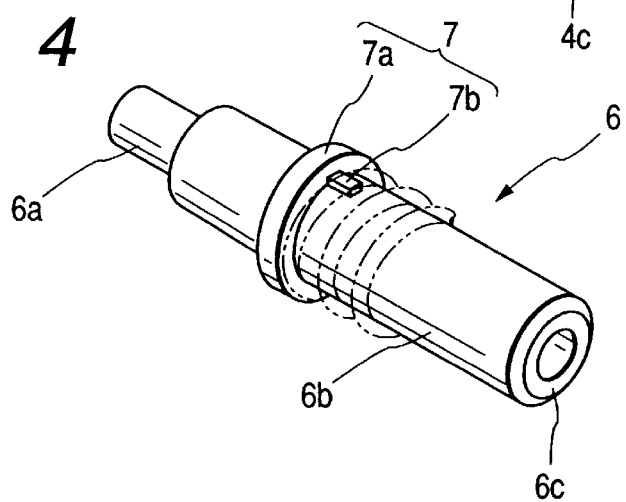
FIG. 4 is a perspective view showing another modified form of the ferrule in FIG. 1.

One preferred embodiment of the present invention will now be described with reference to the drawings. FIG. 1 is an exploded, perspective view showing one preferred embodiment of an optical connector of the invention. FIG. 2 is an enlarged, perspective view of an optical connector plug in FIG. 1. FIG. 3 is a perspective view showing a modified form of a ferrule in FIG. 1. FIG. 4 is a perspective view showing another modified form of the ferrule in FIG. 1.

Those portions, basically identical to those of the conventional construction, will be designated by identical reference numerals, respectively, and detailed explanation thereof will be omitted.

In FIG. 1, reference numeral 1 denotes the optical connector, and this optical connector 1 comprises a pair of optical connector plugs 2 and 2, a ferrule holder 122 similar to that of the conventional construction, and a connector housing 123 similar to that of the conventional construction. The optical connector 1 is adapted to be fitted in a mating connector 124 (see FIG. 5).

Each of the optical connector plugs 2 and 2 comprises a photoconductive member (optical fiber) 105, and a ferrule 3 of a synthetic resin having a compression coil spring 109 (corresponding to a coil spring recited in the appended claims) integrally molded therein. An inner sheath 105c and a conductor portion 105d of the photoconductive member 105 is adapted to be inserted and received in the ferrule 3.

Each of the ferrules 3 and 3 has a cylindrical smaller-diameter portion 3a and a cylindrical larger-diameter portion 3b. An annular engagement projection 3c is formed on the larger-diameter portion 3b, and one end portion of the compression coil spring 109 is insert molded in the larger-diameter portion 3b. A bonding surface 3d is formed at an insertion-side end of the larger-diameter portion 3b for receiving the photoconductive member 105, and a step portion between an outer sheath 105b and the inner sheath 105c is abutted against and adhesively bonded to the bonding surface 3d.

Each of the ferrules 3 and 3 is formed such that the other end portion 109a of the compression coil spring 109 is spaced a suitable distance (see FIG. 1) from the bonding surface 3d, and therefore even if an adhesive, used when assembling the optical connector plug 2, is squeezed out, a correcting operation can be easily effected.

The assembling of the optical connector 1 of the above construction will now be described with reference to FIGS. 1 and 2.

First, an end portion of each of the photoconductive members 105 and 105 is inserted into the associated ferrule 3, and the bonding surface 3d and the above-mentioned step portion are bonded and fixed together by an adhesive, thereby forming the optical connector plug 2 (see FIG. 2).

At this time, the photoconductive member 105 can be inserted into the ferrule 3 while firmly holding the photoconductive member 105 with the hand since the compression coil spring 109 is integrally molded in the ferrule 3, and therefore the assembling of the optical connector plugs 2 and 2 (see FIG. 2) can always be effected in a stable condition.

Then, the optical connector plugs 2 and 2 are introduced respectively into plug receiving chambers 128 and 128 (only one of which is shown) of the ferrule holder 122 through plug-introducing slits 133 and 133 (only one of which is shown), and as the ferrule holder 122 is fitted on the connector housing 123, elongate guide projections 131 and 131 are brought into sliding engagement with guide grooves 151 and 151, respectively. Then, an elastic retaining piece portion 146 (see FIG. 8) is brought into engagement with one wall 138a (see FIG. 8) of a retaining portion 138 (see FIG. 8), so that the connector housing 123 and the ferrule holder 122 are fitted together, thus completing the assembling of the optical connector 1 (see FIGS. 9 and 10 with respect to this completely-assembled condition).

Each of the optical connector plugs 2 and 2, inserted in the associated plug receiving chamber 139 of the connector housing 123, has a play because of the resilient force of the compression coil spring 109 as is the case with the conventional construction.

The optical connector plug 2 is thus assembled in a manner described above with reference to FIGS. 1 and 2, and with this construction, the slide-down of the compression coil spring 109 along the photoconductive member 105, as encountered with the conventional construction, will not occur, and therefore the assembling operation is quite easy. And besides, since the compression coil spring 109 is integral with the ferrule 3, the operation, heretofore required for fitting the compression coil spring on the photoconductive member 105, is omitted, and there will not occur an error in the assembling operation, such as the omission of the compression coil spring 109 and the fitting of more than one compression coil spring. Furthermore, the cost of the compression coil spring is the same as the cost of the compression coil spring used in the conventional construction, and therefore there is no influence from the viewpoint of the cost.

Therefore, there can be provided the optical connector in which the assembling operation is easy, and the efficiency of the operation is markedly enhanced, and the measures are taken against assembling errors.

Modified embodiment

Next, modified forms of the ferrule 3 in FIG. 1 will be described with reference to FIGS. 3 and 4.

A ferrule 4, shown in FIG. 3, has a cylindrical smaller-diameter portion 4a and a cylindrical larger-diameter portion 4b, and a retaining portion 5 is formed on the larger-diameter portion 4b intermediate opposite ends thereof. The retaining portion 5 has a pair of semi-annular engagement projections 5a and 5a, and a pair of claw-like projections 5b and 5b (only one of which is shown). In the assembling operation, the above-mentioned compression coil spring 109 is fitted on the ferrule, and one end portion of this spring is engaged with this retaining portion (Although the one end portion of the compression coil spring 109 is insert molded in the ferrule in the above embodiment, the compression coil spring is not integrally molded in the ferrule, but is used as a separate member in this embodiment).

With the use of this ferrule 4, the operator can confirm the mounting of the compression coil spring 109 when engaging the compression coil spring with the retaining portion, and therefore an assembling error as encountered in the conventional construction will not occur. And besides, the compression coil spring 109 can be retained by the use of the simple construction, and the assembling operation can be carried out without affecting the efficiency of the operation even as compared with the conventional assembling process.

Like the ferrule 4 (see FIG. 3), a ferrule 6, shown in FIG. 4, has a cylindrical smaller-diameter portion 6a and a cylindrical larger-diameter portion 6b, and a retaining portion 7 is formed on the larger-diameter portion 6b intermediate opposite ends thereof. The retaining portion 7 has an annular retaining projection 7a, and a pair of axially-extending ribs 7b and 7b (only one of which is shown). In the assembling operation, the above-mentioned compression coil spring 109 is fitted on the ferrule, and one end portion of this compression coil spring is press-fitted on the ribs.

This ferrule 6 also achieves similar effects as described above for the ferrule 4 (see FIG. 3).

In FIGS. 3 and 4, reference numerals 4c and 6c denote a bonding surface. Although not shown in the drawings, the insertion-side end of each of the ferrules 4 and 6 for receiving the photoconductive member 105 is disposed axially outwardly of the other end of the compression coil spring 109.

Various modifications can, of course, be made without changing the subject matter of the present invention.

As described above, the optical connector includes the optical connector plug, the connector housing, and the ferrule holder. The optical connector plug comprises the photoconductive member, and the ferrule receiving and retaining the end portion of the photoconductive member therein, and there is provided the coil spring retained on or fixed to the ferrule at one end portion thereof. The connector housing has the receiving chamber for receiving the ferrule, and is adapted to be fitted in the housing of the mating connector. The ferrule holder receives the optical connector plug, and is fitted on the connector housing, and the other end portion of the coil spring, remote from the one end portion thereof, abuts against the ferrule holder to maintain an urged condition of the optical connector plug within the receiving chamber.

In this construction of the optical connector, the one end portion of the coil spring is retained on or fixed to the ferrule, and therefore the assembling operation is easy. More specifically, when forming the optical connector plug, the coil spring is kept in a stable condition, and in contrast with the conventional construction, the coil spring will not slide down along the photoconductive member in contrast with the conventional construction.

And besides, there will not occur a confirmation failure which would cause an error in the assembling operation, such as the omission of the coil spring and the fitting of more than one coil spring.

Therefore, advantageously, there can be provided the optical connector in which the assembling operation is easy, and the efficiency of the operation is markedly enhanced, and the measures are taken against assembling errors.

In the present invention, the one end portion of the coil spring is insert molded in the ferrule, and by doing so, the above retaining or fixing of the coil spring is achieved.

By thus insert molding the one end portion of the coil spring in the ferrule, there is no need to make any confirmation for an error in the mounting of the coil spring. And besides, the operation, heretofore required for fitting the coil spring on the photoconductive member, is omitted. Furthermore, when inserting the photoconductive member into the ferrule, the coil spring does not hinder this inserting operation, and the photoconductive member can be inserted while firmly holding this photoconductive member, and therefore the stability of the operation is enhanced.

Therefore, advantageously, the assembling operation is easy, and the efficiency of the operation is markedly enhanced, and the effective measures are taken against errors in the mounting of the coil spring.

There is achieved another advantage that the number of the component parts is reduced.

In the present invention, the one end portion of the coil spring is engaged with the retaining portion formed on the ferrule, and by doing so, the above retaining or fixing of the coil spring is achieved.

With this construction in which the one end portion of the coil spring is thus engaged, the operator can confirm the mounting of the coil spring when engaging the coil spring with the retaining portion, and therefore an assembling error will not occur. And besides, when inserting the photoconductive member into the ferrule, the coil spring does not hinder this inserting operation, and the photoconductive member can be inserted while firmly holding this photoconductive member, and therefore the stability of the operation is enhanced.

Therefore, the assembling operation is easy, and the efficiency of the operation is markedly enhanced, and the effective measures are taken against errors in the mounting of the coil spring.

In the present invention, the retaining portion, formed on the ferrule, has the claw-like projections with which the one end portion of the coil spring is engaged.

Therefore, with this simple construction, the coil spring is easily retained, and the assembling operation can be carried out without affecting the efficiency of the operation even as compared with the conventional assembling process.

In the present invention, the retaining portion, formed on the ferrule, has the ribs on which the one end portion of the coil spring is press-fitted.

Therefore, with this simple construction, the coil spring is easily retained, and the assembling operation can be carried out without affecting the efficiency of the operation even as compared with the conventional assembling process.

In the present invention, the insertion-side end of the ferrule for receiving the photoconductive member is disposed axially outwardly of the other end portion of the coil spring.

With this construction of the ferrule, for example, during the correction of the bonding surface between the ferrule and the photoconductive member, that is, during the correcting operation in which an adhesive, squeezed out when the photoconductive member is inserted into the ferrule, is removed, the coil spring will not hinder this correcting operation. More specifically, in the conventional construction, the coil spring is liable to slide down and drop, and therefore the operation must be carried out while holding the coil spring with the hand during the correcting operation, and the coil spring hinders this correcting operation, thus lowering the efficiency of the operation. With the above construction, however, the other end portion of the coil spring is spaced from the bonding surface, and therefore will not hinder the operation.

Therefore, the efficiency of the correcting operation for removing the squeezed-out portion of the adhesive can be enhanced.

What is claimed is:

1. An optical connector comprising:
    an optical connector plug comprising:
        a photoconductive member;
        a ferrule receiving and retaining an end portion of said photoconductive member therein; and
        a coil spring retained on or fixed to said ferrule at one end portion thereof;
    a connector housing for retaining a housing of a mating connector, said connector housing having a receiving chamber for receiving said ferrule; and
    a ferrule holder for receiving said optical connector plug, said ferrule holder being fitted on said connector housing, the other end portion of said coil spring, remote from said one end portion thereof, abutting against said ferrule holder to maintain a spring-biased engagement with said optical connector plug within said receiving chambers wherein said one end portion of said coil spring is insert molded in said ferrule.

2. An optical connector according to claim 1, wherein said one end portion of said coil spring is engaged with a retaining portion formed on said ferrule.

3. An optical connector according to claim 2, wherein said retaining portion has claw-like projections with which said one end portion of said coil spring is engaged.

4. An optical connector according to claim 2, wherein said retaining portion has ribs on which said one end portion of said coil spring is press-fitted.

5. An optical connector according to any one of claims 1, 2 to 4 wherein an insertion-side end of said ferrule for receiving said photoconductive member is disposed axially outwardly of said other end portion of said coil spring.

* * * * *